United States Patent [19]

Wanetzky et al.

[11] Patent Number: 5,445,789
[45] Date of Patent: Aug. 29, 1995

[54] METHOD AND APPARATUS FOR DEGREASING AND COMPACTING ELECTRICALLY CONDUCTIVE MATERIAL

[75] Inventors: Erwin Wanetzky, Grosskotzenburg; Franz Hugo, Aschaffenburg, both of Germany

[73] Assignee: Leybold Durferrit GmbH, Cologne, Germany

[21] Appl. No.: 213,645

[22] Filed: Mar. 16, 1994

[30] Foreign Application Priority Data

Jun. 9, 1993 [DE] Germany .................. 43 19 166.5

[51] Int. Cl.⁶ .................................. B22F 1/00
[52] U.S. Cl. ........................... 419/52; 419/30; 419/31; 419/36; 419/48; 419/51; 419/60
[58] Field of Search ............. 419/30, 31, 36, 48, 419/51, 52, 60; 219/651, 635, 149; 266/20, 145; 75/226

[56] References Cited

U.S. PATENT DOCUMENTS

| | | | |
|---|---|---|---|
| 3,250,892 | 5/1966 | Inoue | 219/149 |
| 3,501,289 | 3/1970 | Finkl et al. | 75/12 |
| 3,656,946 | 4/1972 | Inque et al. | 75/226 |
| 3,683,094 | 8/1972 | Schlienger | 13/9 |
| 3,871,630 | 3/1975 | Wanetzky et al. | 266/20 |
| 4,380,473 | 4/1983 | Lichtinghagen | 419/41 |
| 4,407,488 | 10/1983 | Wanetzky et al. | 266/148 |
| 4,617,673 | 10/1986 | Fuchs et al. | 373/80 |
| 4,853,178 | 8/1989 | Oslin | 419/23 |
| 5,036,170 | 7/1991 | Arabei et al. | 219/10.41 |

FOREIGN PATENT DOCUMENTS

| | | |
|---|---|---|
| 241668 | 7/1987 | European Pat. Off. . |
| 888181 | 4/1953 | Germany . |
| 2522659 | 11/1976 | Germany . |
| 2752401 | 5/1979 | Germany . |
| 3406760 | 4/1985 | Germany . |
| 3608177 | 3/1987 | Germany . |
| 4028541 | 2/1992 | Germany . |
| 4136990 | 6/1993 | Germany . |
| 1385028 | 6/1975 | United Kingdom . |

Primary Examiner—Donald P. Walsh
Assistant Examiner—John N. Greaves
Attorney, Agent, or Firm—Felfe & Lynch

[57] ABSTRACT

A plunger charged as an electrode is received in a trough charged as a counter-electrode in order to heat material in the trough above the annealing temperature of metal material or the sintering temperature of ceramic-material. The trough and plunger are situated in a vacuum chamber separated from a condenser and pump stand by a valve. The plunger can be retracted into a cover of the chamber by a hydraulic drive on the cover. The cover, drive, and plunger are removable from the lower part of the chamber as a unit.

16 Claims, 3 Drawing Sheets

METHOD AND APPARATUS FOR DEGREASING AND COMPACTING ELECTRICALLY CONDUCTIVE MATERIAL

BACKGROUND OF THE INVENTION

The invention relates to a method and an apparatus for the cleaning and compacting of metal and/or ceramic material, such as lathe cuttings and/or grinding grits.

In the machining or grinding of workpieces large amounts of cuttings or grits are produced which are wet with emulsions or with oils from the machining process. The oil or the emulsion is necessary to the working process. These liquids serve to cool the workpiece and to carry away the cuttings. The cuttings are separated from the liquids in the filters of the machines in question. The liquid itself remains in the machines, while the grits and/or cuttings have to be removed from the filters.

Due to the great surface area of the cuttings, large amounts of lubricant and coolant come out with them. To reduce this loss of liquid the cuttings are centrifuged or pressed. The liquid is returned into the circuit, while the remaining residue must be disposed of. Disposing of these cuttings and/or grits presents considerable difficulty for environmental reasons.

Since the cuttings and/or grits are contaminated with mineral oils, esters, glycerol, emulsifiers, additives containing phosphorus or heavy metals etc., these useful substances should not be recycled directly into the melting process. Another problem is the low bulk density of the cuttings. For proper disposal the cuttings and/or grits would have to be decontaminated and thoroughly compacted.

In the known cleaning processes the degreasing is performed by washing, pressing or centrifugation. In thermal processes the heat is applied by indirect inductance, resistance heating or even flame heat sources.

SUMMARY OF THE INVENTION

The invention is addressed to the task of developing a method and an apparatus which will permit the cleaning, especially the degreasing, and the compacting of the electrically conductive metal or ceramic material under economically acceptable conditions, and will enable the useful substances recovered to be recycled.

This task is accomplished according to the invention by the use of a vacuum chamber with a pump stand and at least one condenser, a trough and a press plunger. The material to be treated—cuttings and/or grits—is put into the trough and the press plunger is driven by a driving means into the trough. The plunger is configured as an electrode and the trough as the counter-electrode, and by applying an electrical voltage between the electrodes the material to be treated can be heated by the direct passage of current through it. Due to the high electrical resistance in comparison with typical resistance heating materials, and the resultant low current, an advantageous, gentle heating of the evaporable substances is achieved. Another property of the cuttings is their compressibility. For this reason the resistance can be varied according to the compression of the cuttings.

The initially still high electrical resistance due to the oil-insulated surfaces of the material being treated will diminish after a brief warming period and a constant electrical resistance will establish itself.

The electrical heating power corresponds to the product of current times voltage. The current applied in the process is selected so that in the material a current density of at least 0.02 A/mm$^2$ can be created for the degreasing. The maximum electrical voltage should be selected below the arcing voltage, preferably 15 V, but in no case should it be greater than 25 volts.

Since the cuttings initially occupy a great amount of space in the trough, a temperature above the annealing temperature of the particular steel or above the sintering temperature of the ceramic is necessary for their compaction. At these temperatures the cuttings lose their springy quality and can thus be deformed plastically, i.e., can be compacted.

The electrodes themselves are so constructed that a uniform flooding with the current is achieved. The entire cross section of the cuttings is thus heated to the evaporation temperature of the oil or to the softening temperature, as the case may be.

The pressing electrode or press plunger is preferably not cooled. The vacuum chamber in which the trough is contained with the press plunger is of such a shape that the condensate runs down on the chamber walls and cannot drip back onto the compact in the trough.

In one embodiment, the following typical process parameters are established for the degreasing:

1. Specific bulk weight of the cuttings: 0.4 kg/cm$^3$
2. Specific electrical resistance after placement in the trough: 200 mΩcm.
3. Current density: 0.02 A/mm$^2$.
4. Voltage between electrodes, approx. 10 V, with an electrode spacing of 200 mm.

An adsorbed or absorbed moisture content must always be expected in materials charged with oils or fats. But in the pre-evacuation, pressures are possible only up to the triple point. Consequently, in treating these materials the method of the invention is practiced in two steps. At the beginning the high latent heat of the water is used for the rapid and intense preheating of the materials and for the liquefaction of the highly viscous grease layer. While the water is being removed from the system in vapor form in a separate evacuation and condensation step, the grease layer drips downward. Holes are made in the trough bottom, through which the liquefied oil can escape. The remainder of the process of the invention is then performed as described above.

In contrast to the known process, the process and apparatus according to the invention require the separation of the vacuum chamber from the condenser, which is made possible by a shut-off means.

DETAILED DESCRIPTION OF THE PREFERRED EMBODIMENT

Figure 1:
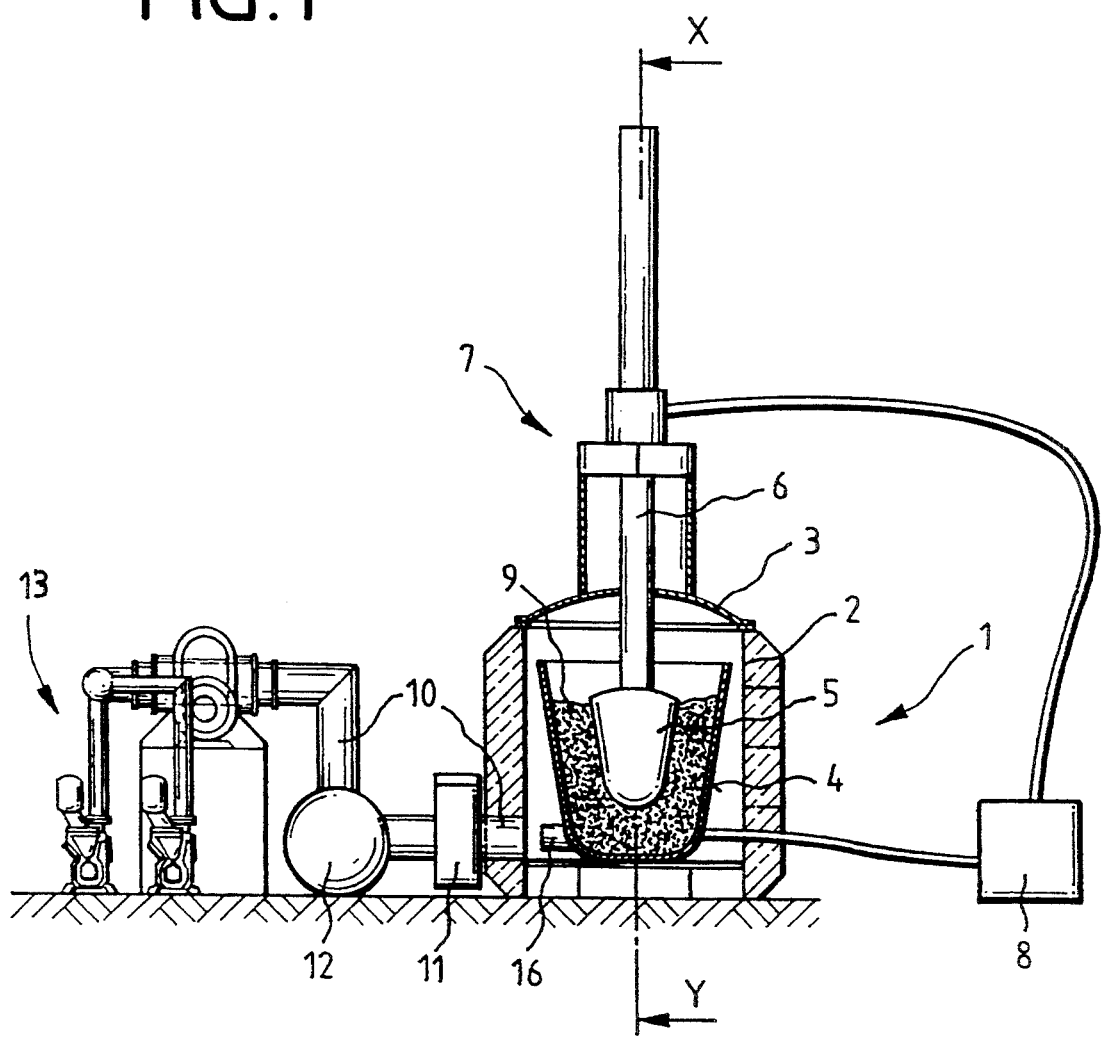
FIG. 1 shows in cross section a vacuum chamber with a trough, a press plunger and a vacuum pump, FIG. 2 an apparatus in accordance with FIG. 1, but with a vacuum chamber opened for loading and FIG. 3 a vacuum chamber with cover and press plunger in a cross section taken along line XX of FIG. 1.
Figure 2:
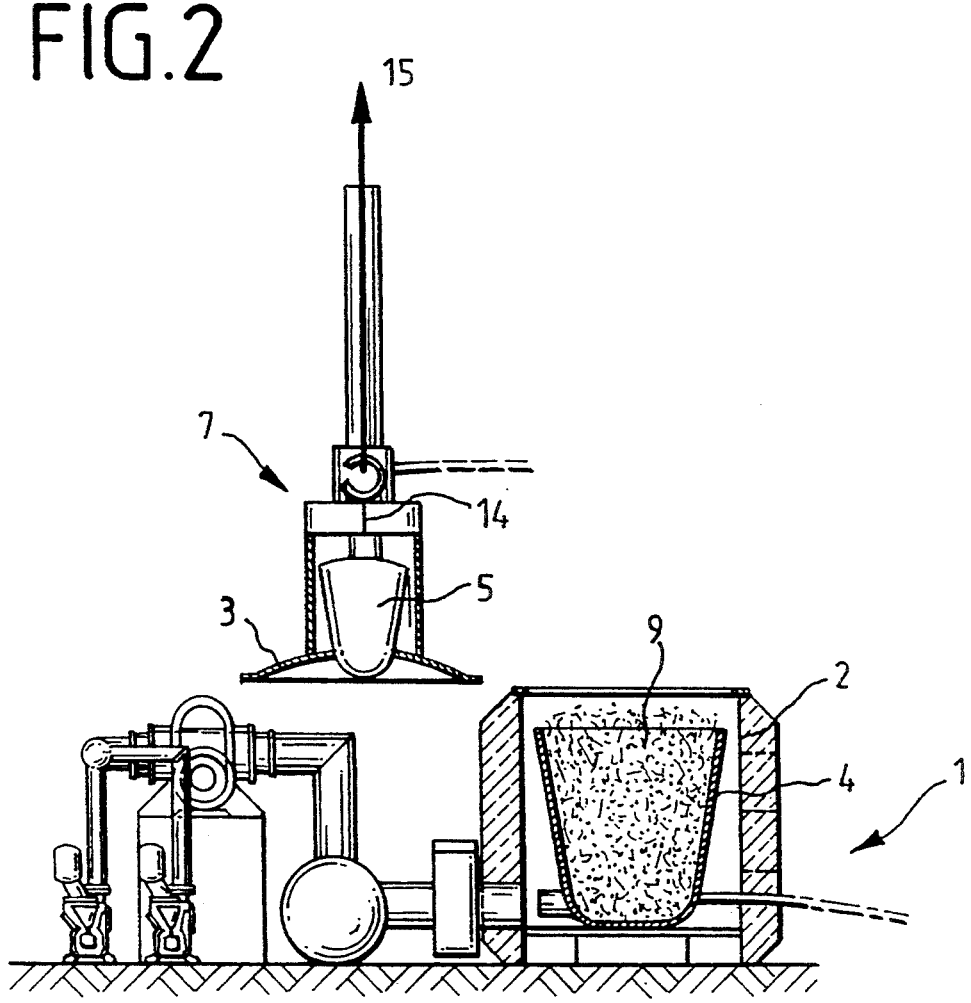

A vacuum chamber 1 (FIG. 1) consists of a trough-like bottom part 2 and a domed cover 3. On the floor of the bottom part 2 stands a trough 4 which can be divided in the direction of the section line X—X and has a bottom outlet 16. A mushroom-shaped press plunger 5 represented in cross section reaches down from above into the trough 4. The plunger 5 is connected by a shaft 6 to a hydraulic drive 7 which is disposed above the chamber cover 3. The trough 4 and also the press plunger 5 are connected to a power supply 8, so that the plunger 5 is an electrode and the trough 4 is a counter-electrode, and the material 9 can be heated by the direct passage of current through it.

In the bottom part 2 of the chamber there is provided a suction line 10 in which a shut-off valve 11 is disposed. This is followed by a condenser 12 and a vacuum pump stand 13.

For the loading and unloading of the vacuum chamber 1, the plunger 5 is raised by the drive 7 to the uppermost position within the chamber cover 3. Then the cover 3 is removed from the lower part by a lifting and moving system 15. The material 9, for example cuttings, is then poured into the chamber loosely. During the loading and unloading procedure the press plunger 5 is completely withdrawn into the cover 3.

Figure 3:
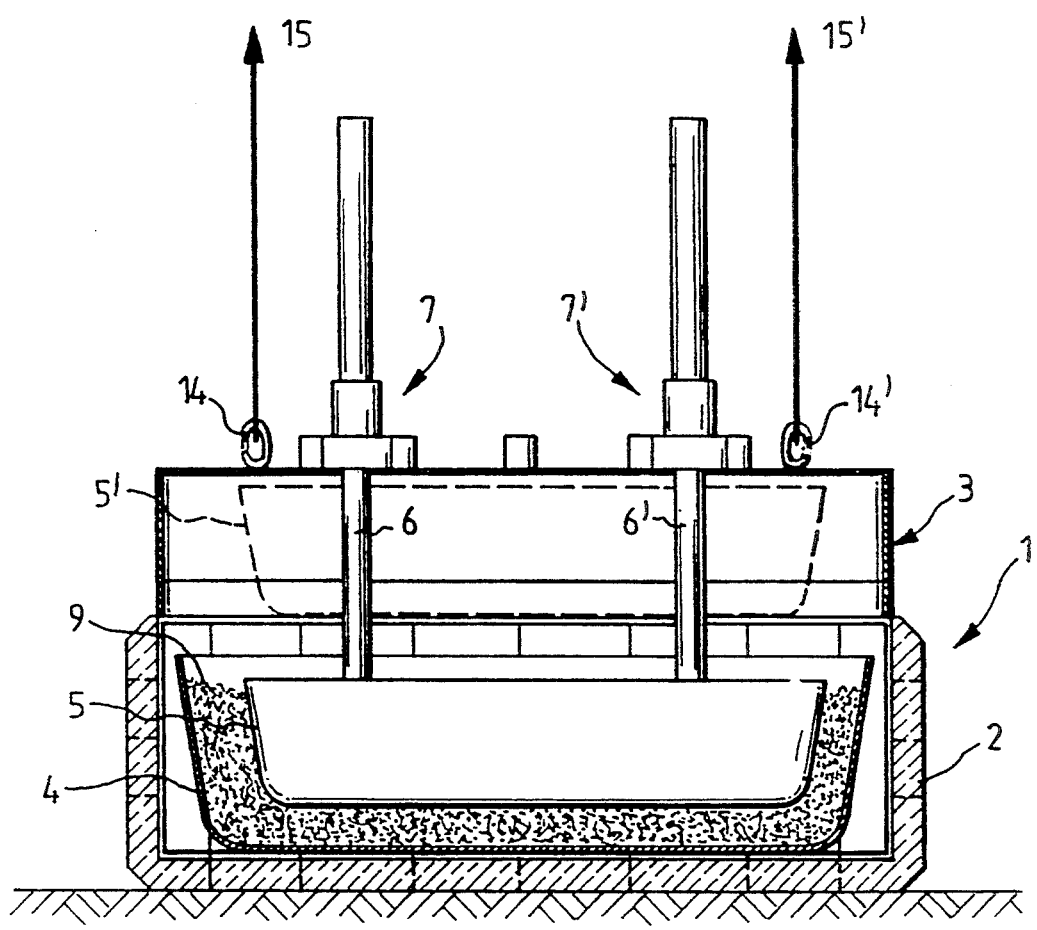

The elongated shape of the vacuum chamber 1 and its interior parts can be seen in FIG. 3 in a section taken along line XX in FIG. 1. The trough 4 and the press plunger 5 both have a boat-tail-like cross-sectional shape, while the vertical and horizontal distance between the external surfaces of the press plunger 5 and the inside walls of the trough 4 is equal in the lowermost position in the working state.

The two plunger shafts 6 and 6' are provided on the top of the plunger 5 and can be raised by the driving means 7 and 7' into the upper or rest position 5' in the chamber cover 3.

The raising system 15, 15' for the cover and plunger is attached by cables to rings 14 and 14' which are provided on the top of the chamber cover 3.

We claim:

1. Method for cleaning electrically conductive material, comprising
    placing contaminated electrically conductive material to be compacted in a trough in a vacuum chamber,
    evacuating said vacuum chamber,
    moving a plunger into said trough to compact said material, and
    charging said plunger as an electrode and said trough as a counter-electrode in order to pass a direct current through said material, thereby heating said material.

2. Method as in claim 1 wherein a current density of at least 0.02 A/mm$^2$ is established in said material by passing current between said electrode and said counter-electrode.

3. Method as in claim 1 wherein said material is cuttings of metal having a characteristic annealing temperature, said material being heated to above the annealing temperature.

4. Method as in claim 1 wherein said material has a characteristic sintering temperature, said material being heated to above the sintering temperature.

5. Method as in claim 1 wherein said plunger is constantly advanced during heating, thereby compacting said material.

6. Method as in claim 1 wherein said plunger and said trough have a characteristic arcing voltage for the material being compacted, said plunger and said trough being charged to a voltage which is less than said arcing voltage.

7. Method for cleaning contaminated electrically conductive material, comprising
    placing contaminated electrically conductive material in a container in a vacuum chamber,
    evacuating said vacuum chamber,
    compacting said material in said container, and
    applying a voltage across said material while said material is being compacted, thereby heating said material by resistance to electrical current therethrough.

8. Method as in claim 7 further comprising
    collecting vapors released from said material being compacted and heated, and
    condensing said vapors.

9. Method as in claim 7 further comprising collecting liquids released from said material being compacted and heated.

10. Method as in claim 9 wherein a current density of at least 0.02 A/mm is established in said material during heating.

11. Method as in claim 7 wherein said material is cuttings of metal having a characteristic amending temperature, said material being heated to above said annealing temperature.

12. Method as in claim 7 wherein said material has a characteristic sintering temperature, said material being heated to above the sintering temperature.

13. Method as in claim 7 wherein said material is compacted by a plunger moving into said container.

14. Method as in claim 13 wherein said plunger and said container serve as electrodes for applying said voltage across said material.

15. Method as in claim 14 wherein said plunger is constantly advanced during heating.

16. Method as in claim 7 wherein said plunger and said container have a characteristic arcing voltage for the material being compacted, said plunger and said trough being charged to a voltage which is less than said arcing voltage.

* * * * *